United States Patent
Kobayashi et al.

(10) Patent No.: US 9,947,928 B2
(45) Date of Patent: Apr. 17, 2018

(54) NONAQUEOUS ELECTROLYTE SECONDARY BATTERY

(71) Applicant: SANYO Electric Co., Ltd., Daito-shi, Osaka (JP)

(72) Inventors: Kei Kobayashi, Osaka (JP); Tatsuki Hiraoka, Hyogo (JP); Masahiro Shiraga, Hyogo (JP); Taizou Sunano, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 83 days.

(21) Appl. No.: 14/761,740

(22) PCT Filed: Feb. 10, 2014

(86) PCT No.: PCT/JP2014/000691
§ 371 (c)(1),
(2) Date: Jul. 17, 2015

(87) PCT Pub. No.: WO2014/132578
PCT Pub. Date: Sep. 4, 2014

(65) Prior Publication Data
US 2015/0364764 A1     Dec. 17, 2015

(30) Foreign Application Priority Data
Feb. 28, 2013 (JP) .................................. 2013-038095

(51) Int. Cl.
*H01M 4/62* (2006.01)
*H01M 4/13* (2010.01)
(Continued)

(52) U.S. Cl.
CPC .............. *H01M 4/62* (2013.01); *H01M 4/13* (2013.01); *H01M 4/366* (2013.01); *H01M 10/052* (2013.01); *H01M 2004/027* (2013.01)

(58) Field of Classification Search
CPC combination set(s) only.
See application file for complete search history.

(56) References Cited

U.S. PATENT DOCUMENTS

| 5,385,777 A * | 1/1995 | Higuchi | C08J 5/18 |
| | | | 428/308.4 |
| 6,682,848 B1 * | 1/2004 | Yano | H01M 4/70 |
| | | | 429/206 |

(Continued)

FOREIGN PATENT DOCUMENTS

| CN | 101145621 A | 3/2008 |
| CN | 102208634 A | 10/2011 |

(Continued)

OTHER PUBLICATIONS

Office Action dated Sep. 5, 2016, issued in counterpart Chinese Patent Application No. 201480010974.6, with English translation (14 pages).

(Continued)

*Primary Examiner* — Imran Akram
(74) *Attorney, Agent, or Firm* — Westerman, Hattori, Daniels & Adrian, LLP

(57) ABSTRACT

The initial charge/discharge efficiency and cycle characteristics of a nonaqueous electrolyte secondary battery are improved. Provided is a nonaqueous electrolyte secondary battery including a positive electrode, a negative electrode, a porous layer placed on the negative electrode, a separator, and a nonaqueous electrolyte. The porous layer has flat voids. The minor axis direction of each flat void is perpendicular to the plane direction of the porous layer and the major axis direction of the flat void is parallel to the plane direction of the porous layer. The ratio of the major axis to the minor axis of the flat void preferably ranges from 1.4 to 2.2.

9 Claims, 1 Drawing Sheet

(51) Int. Cl.
  *H01M 10/052* (2010.01)
  *H01M 4/36* (2006.01)
  *H01M 4/02* (2006.01)

(56) References Cited

U.S. PATENT DOCUMENTS

| | | |
|---|---|---|
| 2008/0070120 A1 | 3/2008 | Miyawaki et al. |
| 2010/0143801 A1* | 6/2010 | Inoue ............... C01G 51/42 429/221 |
| 2010/0151325 A1* | 6/2010 | Kasamatsu ......... H01M 2/1653 429/223 |
| 2011/0135810 A1 | 6/2011 | Yakovleva et al. |
| 2011/0223486 A1* | 9/2011 | Zhang ............... B01D 67/0027 429/247 |
| 2012/0070644 A1* | 3/2012 | Kang ................. B01D 69/02 428/220 |
| 2012/0156568 A1* | 6/2012 | Kia ................... H01M 2/145 429/246 |
| 2012/0219864 A1* | 8/2012 | Ikoma ................ C08J 5/18 429/247 |
| 2012/0301698 A1* | 11/2012 | Rhee ................. B32B 7/02 428/220 |
| 2013/0017444 A1* | 1/2013 | Honkura ............. H01M 4/13 429/211 |
| 2013/0216879 A1* | 8/2013 | Egawa ............. H01M 10/0587 429/94 |
| 2014/0110827 A1* | 4/2014 | Tsukahara ........... H01L 24/90 257/674 |

FOREIGN PATENT DOCUMENTS

| | | |
|---|---|---|
| CN | 102593418 A | 7/2012 |
| JP | 11-144706 A | 5/1999 |
| JP | 2005-135925 A | 5/2005 |
| JP | 2007-294196 A | 11/2007 |
| JP | 2008-98151 A | 4/2008 |
| JP | 2011-29075 A | 2/2011 |
| JP | 2012-216385 A | 11/2012 |
| JP | 2013-125697 A | 6/2013 |
| WO | 99/26306 A1 | 5/1999 |
| WO | 2011/068767 A1 | 6/2011 |
| WO | WO 2013105161 A1 * | 7/2013 ............ H01L 24/72 |

OTHER PUBLICATIONS

Office Action dated Aug. 31, 2016, issued in counterpart Chinese Patent Application No. 201480006425.1, with English translation. (15 pages).

International Search Report dated Apr. 1, 2014, issued in counterpart application No. PCT/JP2014/000691 (2 pages).

Office Action dated Jun. 20, 2017, issued in counterpart Japanese Patent Application No. 2015-502744, with English translation. (5 pages).

\* cited by examiner

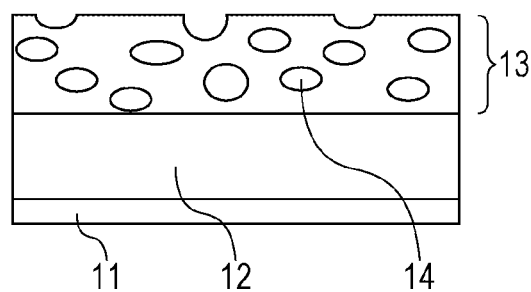

NONAQUEOUS ELECTROLYTE SECONDARY BATTERY

TECHNICAL FIELD

The present invention relates to a nonaqueous electrolyte secondary battery.

BACKGROUND ART

In order to increase the energy density and power of lithium ion batteries, attempts have been made to use metal materials, such as silicon, germanium, tin, and zinc, alloying with lithium and oxides of these metals as negative electrode active materials instead of carbonaceous materials such as graphite.

Lithium released from a positive electrode active material is absorbed into a negative electrode active material made of a metal material alloying with lithium or oxides of these metals during initial charge. All the lithium cannot be extracted during discharge and an indefinite amount of the lithium is retained in the negative electrode active material, thereby causing irreversible capacity. Patent Literature 1 below discloses a nonaqueous electrolyte secondary battery in which a film containing a metallic lithium powder is formed on a negative electrode for the purpose of compensating for irreversible capacity.

CITATION LIST

Patent Literature

PTL 1: Japanese Published Unexamined Patent Application No. 2008-98151

SUMMARY OF INVENTION

Technical Problem

However, the nonaqueous electrolyte secondary battery disclosed in Patent Literature 1 has a problem that initial charge/discharge efficiency and cycle characteristics cannot be sufficiently improved.

Solution to Problem

In order to solve the above problem, a nonaqueous electrolyte secondary battery according to the present invention includes a positive electrode, a negative electrode, a porous layer placed on the negative electrode, a separator, and a nonaqueous electrolyte. The porous layer has flat voids. The minor axis of each flat void has a direction perpendicular to the plane direction of the porous layer and the major axis of the flat void has a direction parallel to the plane direction of the porous layer.

The flat voids, which are included in the porous layer, are formed by absorbing flat lithium particles into a negative electrode active material.

Advantageous Effects of Invention

In accordance with a nonaqueous electrolyte secondary battery according to the present invention, initial charge/discharge efficiency and cycle characteristics can be improved.

BRIEF DESCRIPTION OF DRAWING

FIG. 1 is a sectional view of a porous layer which is an example of an embodiment of the present invention.

DESCRIPTION OF EMBODIMENTS

Embodiments of the present invention are described below in detail.

A drawing referred to in the description of the embodiments is one schematically drawn. Dimensional proportions and the like of each component illustrated in the drawing may possibly be different from those of an actual one. Detailed dimensional proportions and the like should be judged in consideration of descriptions below. In this specification, the term "approximately **" is intended to include completely the same things and those regarded as substantially the same, as described using the term "approximately the same" as an example.

A nonaqueous electrolyte secondary battery which is an example of an embodiment of the present invention includes a positive electrode containing a positive electrode active material, a negative electrode containing a negative electrode active material, a porous layer placed on the negative electrode, a nonaqueous electrolyte containing a nonaqueous solvent, and a separator. An example of the nonaqueous electrolyte secondary battery is a structure in which an electrode assembly formed by winding the positive electrode, the negative electrode, and the separator interposed therebetween and the nonaqueous electrolyte are placed in an enclosure.

(Positive Electrode)

The positive electrode is preferably composed of a positive electrode current collector and a positive electrode active material layer formed on the positive electrode current collector. The positive electrode current collector includes, for example, a conductive thin-film, particularly metal or alloy foil which is made of aluminum or the like and which is stable within the potential of the positive electrode, or a film including a metal surface layer made of aluminum or the like. The positive electrode active material layer preferably contains the positive electrode active material, a conductive material, and a binder.

The positive electrode active material is not particularly limited and is preferably a lithium transition metal oxide. The lithium transition metal oxide may contain a non-transition metal element such as Mg or Al. Examples of the lithium transition metal oxide include lithium cobaltate, olivine-type lithium phosphates typified by iron lithium phosphate, Ni—Co—Mn, Ni—Mn—Al, and Ni—Co—Al. The positive electrode active material may contain one of these compounds or a combination of any of these compounds.

The conductive material used may be carbon materials such as carbon black, acetylene black, Ketjen black, and graphite or a combination of two or more thereof. The binder used may be polytetrafluoroethylene, polyvinylidene fluoride, polyvinyl acetate, polyacrylonitrile, and polyvinyl alcohol or a combination of two or more thereof.

(Negative Electrode)

The negative electrode preferably includes a negative electrode current collector and a negative electrode active material layer formed on the negative electrode current collector. The negative electrode current collector includes, for example, a conductive thin-film, particularly metal or alloy foil which is made of copper or the like and which is stable within the potential of the negative electrode, or a film including a metal surface layer made of copper or the like. The negative electrode active material layer preferably contains the negative electrode active material and a binder. As is the case with the positive electrode, this binder may contain polytetrafluoroethylene or the like and preferably contains styrene-butadiene rubber (SBR), polyimide, or the like. This binder may be used in combination with a thickening agent such as carboxymethylcellulose.

The negative electrode active material contains a metal material alloying with lithium or oxides of these metals. The negative electrode active material is preferably silicon (Si), a silicon alloy, or a silicon oxide. The negative electrode active material more preferably has mother particles made of silicon, a silicon alloy, or a silicon oxide ($SiO_x$, where x is 0.5 to 1.5) and conductive cover layers each covering at least one portion of the surface of a corresponding one of the mother particles. From the viewpoint of achieving both high capacity and enhanced cycle characteristics, the negative electrode active material is preferably used in combination with another negative electrode active material which exhibits a smaller volume change due to charge/discharge than the metal material alloying with lithium or the oxides of these metals and which is, for example, a carbon material such as graphite or hard carbon.

The cover layers are conductive layers made of a material higher in conductivity than Si and $SiO_x$. A conductive material making up the cover layers is preferably electrochemically stable and is preferably at least one selected from the group consisting of carbon materials, metals, and metal compounds.

In the case of using the metal material alloying with lithium or the oxides of these metals in combination with the carbon material, such as graphite or hard carbon, in the negative electrode active material, the mass ratio of the metal material alloying with lithium or the oxides of these metals to the carbon material preferably ranges from 1:99 to 20:80. When the mass ratio thereof is within this range, both high capacity and enhanced cycle characteristics are likely to be achieved. On the other hand, when the proportion of the metal material alloying with lithium or the oxides of these metals to the mass of the negative electrode active material is less than 1% by mass, the merit of achieving high capacity by adding the metal material alloying with lithium or the oxides of these metals is small.

(Porous Layer)

The porous layer is described below in detail.

As shown in FIG. 1, the porous layer has flat voids. The minor axis of each flat void has a direction approximately perpendicular to the plane direction of the porous layer and the major axis of the flat void has a direction approximately parallel to the plane direction of the porous layer. Incidentally, a cross section of the flat void that is parallel to the plane direction of the porous layer is approximately circular.

The flat voids are preferably formed in such a manner that a layer containing flat lithium particles is provided on the negative electrode and lithium is then electrochemically absorbed in the negative electrode active material such that the porous layer is formed so as to have the flat voids as shown in FIG. 1.

The layer containing the flat lithium particles is preferably formed by rolling a layer containing spherical lithium particles. Rolling conditions are not particularly limited to as long as, for example, the spherical lithium particles in the layer are transformed into the flat lithium particles. Rolling is preferably performed with a linear load of 10 kgf/cm to 1,000 kgf/cm.

The ratio of the major axis to the minor axis of each flat void preferably ranges from 1.2 to 5.0 and more preferably 1.4 to 2.2. This range allows the infiltration rate of an electrolyte solution in the plane direction of the porous layer to be high and allows the acceptability of the electrolyte solution in the plane direction to be good. When the ratio of the major axis to the minor axis is excessively small, the acceptability of the electrolyte solution in the plane direction tends to be low. When the ratio thereof is excessively large, maintaining the shape of the porous layer tends to be difficult.

The flat voids are preferably present on a surface of the porous layer in a concave pattern, the surface being located on the side not facing the negative electrode. The presence of the voids on the surface thereof in such a concave pattern allows the acceptability of the electrolyte solution to be further enhanced.

The area fraction of the flat voids in a cross section of the porous layer that is approximately perpendicular to the plane direction of the porous layer is preferably 20% to 90% and more preferably 40% to 80%. When the area fraction thereof is excessively small, the acceptability of the electrolyte solution in the plane direction tends to be low. When the area fraction thereof is excessively large, the strength of the porous layer is low and therefore maintaining the shape of the porous layer tends to be difficult.

The size of each flat void is preferably 1 μm to 35 μm in the minor axis direction and 2 μm to 70 μm in the major axis direction.

The surface of the flat void preferably has an organic film. This is because when the layer containing the lithium particles is formed, a deactivation reaction due to moisture or the like in air is suppressed in the case where the surface of each lithium particle is covered by the organic film.

The organic film is preferably made of a material which does not alloy with lithium and which is electrochemically stable. The material is preferably at least one selected from the group consisting of, for example, organic rubbers, organic resins, and metal carbonates.

The porous layer preferably contains a conductive material. The conductive material is preferably one used in the positive electrode or the negative electrode. When the porous layer contains the conductive material, lithium is likely to be absorbed into the negative electrode active material layer.

The thickness of the porous layer depends on the irreversible capacity of the negative electrode active material layer and is appropriately adjusted.

The layer containing the flat lithium particles in the plane direction is preferably formed on the negative electrode. In other words, the porous layer is preferably formed on the negative electrode. In the case of forming the layer containing the lithium particles on the negative electrode, lithium is likely to be absorbed into the negative electrode active material layer.

(Nonaqueous Electrolyte)

The nonaqueous electrolyte contains the nonaqueous solvent and an electrolyte salt dissolved in the nonaqueous solvent. The nonaqueous electrolyte is not limited to a liquid electrolyte (nonaqueous electrolyte solution) and may be a solid electrolyte containing a gelled polymer or the like. Examples of the nonaqueous solvent include esters, ethers, nitriles (such as acetonitrile), and amides (such as dimethylformamide). Two or more of these solvents may be used in combination.

Examples of the esters include cyclic carbonates such as ethylene carbonate (EC), propylene carbonate, and butylene carbonate; linear carbonates such as dimethyl carbonate, methyl ethyl carbonate, diethyl carbonate (DEC), methyl propyl carbonate, ethyl propyl carbonate, and methyl isopropyl carbonate; and carboxylic esters such as methyl acetate, ethyl acetate, propyl acetate, methyl propionate, ethyl propionate, and γ-butyrolactone.

Examples of the ethers include cyclic ethers such as 1,3-dioxolane, tetrahydrofuran, 2-methyltetrahydrofuran, propylene oxide, 1,2-butylene oxide, 1,3-dioxane, furan, and 1,8-cineol and linear ethers such as 1,2-dimethoxyethane, ethyl vinyl ether, ethyl phenyl ether, 1,2-diethoxyethane, 1,2-dibutoxyethane, diethylene glycol dimethyl ether, 1,1-dimethoxymethane, 1,1-diethoxyethane, and triethylene glycol dimethyl ether.

The nonaqueous solvent used is preferably at least one cyclic carbonate selected from the above solvents and more preferably a mixture of the cyclic carbonate and a linear carbonate selected from the above solvents. Alternatively, the nonaqueous solvent used may be a halide obtained by substituting a hydrogen atom of a solvent with a halogen atom such as a fluorine atom.

The electrolyte salt is preferably a lithium salt. Examples of the lithium salt include $LiPF_6$, $LiBF_4$, $LiAsF_6$, $LiN(SO_2CF_3)_2$, $LiN(SO_2CF_5)_2$, and $LiPF_{6-x}(C_nF_{2n+1})_x$ (where $1<x<6$ and n is 1 or 2). These lithium salts may be used alone or in combination. The concentration of the lithium salt is preferably 0.8 mol to 1.8 mol per liter of the nonaqueous solvent.

(Separator)

The separator used is a porous sheet having ion permeability and insulating properties. Examples of the porous sheet include microporous thin-films, woven fabric, and nonwoven fabric. The separator is preferably made of a polyolefin such as polyethylene or a polypropylene.

EXAMPLES

The present invention is further described below in detail with reference to an example. The present invention is not limited to the example.

Example 1

[Preparation of Positive Electrode]

Lithium cobaltate, acetylene black, and polyvinylidene fluoride were mixed in a mixer at a mass ratio of 100:1.5:1.5 together with an adequate amount of N-methylpyrrolidone, whereby positive electrode mix slurry was prepared. The positive electrode mix slurry was applied to both surfaces of a positive electrode current collector sheet including Al foil with a thickness of 15 μm and was then dried. After being rolled, the positive electrode current collector sheet was cut to a predetermined size corresponding to a battery case made from a laminate, whereby a positive electrode for use in a lithium ion battery of Experiment Example 1 was obtained. The packing density of each positive electrode active material layer was 3.8 g/mL.

[Preparation of Negative Electrode]

(Preparation of Negative Electrode Active Material Layers)

SiO particles, coated with a conductive carbon material, having an average particle size ($D_{50}$) of 6 μm; graphite having an average particle size ($D_{50}$) of 25 μm; carboxymethylcellulose; and styrene-butadiene rubber were mixed in a mixer at a mass ratio of 10:90:1:1 together with an adequate amount of water, whereby negative electrode mix slurry was prepared. The negative electrode mix slurry was applied to both surfaces of a negative electrode current collector sheet including copper foil with a thickness of 10 μm and was then dried, followed by rolling. The packing density of each negative electrode active material layer was 1.60 g/mL.

(Preparation of Layers Containing Lithium Particles)

SLMP produced by FMC Corporation, acetylene black, and polyvinylidene fluoride were mixed in a mixer at a mass ratio of 64:16:20 together with an adequate amount of N-methylpyrrolidone, whereby slurry was prepared. The slurry was applied to the negative electrode active material layers and was then dried. Incidentally, SLMP produced by FMC Corporation contains spherical lithium particles each having an organic film thereon.

(Rolling of Layers Containing Lithium Particles)

Layers, containing lithium particles, formed on the negative electrode and dried were rolled with a linear load of 300 kgf/cm in such a manner that the layers were fed between rolls with a diameter of 65 mm. The negative electrode current collector sheet was cut to a predetermined size corresponding to the battery case made from the laminate, whereby a negative electrode for use in the lithium ion battery of Experiment Example 1 was obtained.

[Preparation of Nonaqueous Electrolyte Solution]

To a nonaqueous solvent prepared by mixing EC and DEC at an EC-to-DEC ratio of 3:7 (volume ratio), 1.0 mol/L of $LiPF_6$ was added, whereby a nonaqueous electrolyte solution was prepared.

[Preparation of Test Cell C1]

A tab was attached to each of the above electrodes. The positive electrode and the negative electrode were spirally wound with the separator interposed therebetween such that the tab was located at the outermost edge, whereby an electrode assembly was prepared. The electrode assembly was provided in an enclosure made from an aluminum laminate sheet and was then vacuum-dried at 105° C. for 2 hours. Thereafter, the nonaqueous electrolyte solution was poured into the enclosure. An opening of the enclosure was sealed, whereby Test Cell C1 was prepared. Incidentally, the design capacity of Test Cell C1 was 800 mAh.

Comparative Example 1

Test Cell R1 was obtained in substantially the same manner as that described in Example 1 except that a layer, containing lithium particles, formed on a negative electrode active material layer was not rolled.

Comparative Example 2

Test Cell R2 was obtained in substantially the same manner as that described in Example 1 except that any layer containing lithium particles was not formed on a negative electrode active material layer.

<Evaluation of Battery Performance>

Batteries C1, R1, and R2 were evaluated for initial charge/discharge efficiency and cycle characteristic as shown in Table 1.

[Initial Charge/Discharge Efficiency]

Charge: Constant-current charge was performed at a current of 0.5 It until the voltage reached 4.3 V, followed by performing constant-voltage charge at a voltage of 4.3 V until the current reached 0.05 It.

Discharge: Constant-current discharge was performed at a current of 0.2 It until the voltage reached 2.75 V.

Rest: The time of rest between the charge and the discharge was 10 minutes.

The proportion of the discharge capacity of the first cycle to the charge capacity of the first cycle was defined as initial charge/discharge efficiency.

Initial charge/discharge efficiency (%)=(discharge capacity of first cycle/charge capacity of first cycle)×100

[Cycle Test]

The test cells were subjected to a cycle test under the above charge/discharge conditions.

The proportion of the discharge capacity of the 50th cycle to the discharge capacity of the first cycle was defined as a cycle characteristic.

Cycle characteristic (%)=(discharge capacity of 50th cycle/discharge capacity of first cycle)×100

TABLE 1

| Battery | Layer containing lithium particles | Pressing of layer containing lithium particles | Initial charge/discharge efficiency (%) | Cycle characteristic (%) |
|---|---|---|---|---|
| C1 | Formed | Performed | 92.5 | 89.2 |
| R1 | Formed | Not performed | 90.3 | 87.3 |
| R2 | Not formed | — | 82.9 | 85.3 |

As is clear from Table 1, in C1 and R1, in which the layer containing the lithium particles was placed on the negative electrode, lithium is absorbed into the negative electrode active material layer and therefore the initial charge/discharge efficiency and the cycle characteristic are improved.

C1, in which the layer containing the lithium particles was rolled, is superior in initial charge/discharge efficiency and cycle characteristic to R1, in which the layer containing the lithium particles was not rolled. This is probably because flat voids are formed in the porous layer of C1 in the plane direction of the porous layer and therefore the electrolyte solution acceptability of the voids in the plane direction of the porous layer is enhanced as compared to that of spherical voids formed in the porous layer of R1.

<Measurement of Cross-Sectional Area Occupancy of Voids and Minor Axis and Major Axis of Each Void>

The negative electrode was taken out of each of batteries C1 and R1 charged and discharged in the first cycle. A through-thickness cross section (a cross section perpendicular to the plane direction) of the negative electrode was prepared using a cross-section polisher and was observed with a SEM. In the cross section, a region with a length of 1 mm was defined as a measurement region and was taken out, followed by measuring the area occupancy of the flat voids and the minor axis and major axis of each void from a SEM image.

Area occupancy=total area of flat voids/(maximum thickness of porous layer in measurement region×1 mm)

The area occupancy, the minor axis, the major axis, and the average of the ratio of the major axis to the minor axis are shown in Table 2. In C1, the minimum of the ratio of the major axis to the minor axis is 1.4 and the maximum thereof is 2.2.

TABLE 2

| Battery | Area occupancy (%) | Minor axis (μm) | Major axis (μm) | Major axis/minor axis |
|---|---|---|---|---|
| C1 | 60 | 14 | 23 | 1.6 |
| R1 | 25 | 38 | 38 | 1.0 |

REFERENCE SIGNS LIST

11 Negative electrode current collector
12 Negative electrode active material layer
13 Porous layer
14 Voids

The invention claimed is:

1. A negative electrode apparatus for a nonaqueous electrolyte secondary battery, comprising:
a negative electrode active material layer, and
a porous layer on the negative electrode active material layer;
wherein the porous layer has flat a plurality of voids, the minor axis direction of each flat void is perpendicular to the plane direction of a surface of the porous layer, and the major axis direction of each the flat void is parallel to the plane direction of the surface of the porous layer,
wherein, in each void, the major axis is larger than the minor axis,
wherein a cross-section of each of the voids, taken in the plane direction of the surface of the porous layer, is approximately circular, and
wherein a cross-section of each of the voids, taken in either direction perpendicular to the plane direction of the surface of the porous layer, is an ellipse;
wherein the size of each flat void is 1 pm to 35 pm in the minor axis direction, and 2 pm to 70 pm in the major axis direction.

2. The negative electrode apparatus for a nonaqueous electrolyte secondary battery according to claim 1, wherein the ratio of the major axis to the minor axis of each void ranges from 1.4 to 2.2.

3. The negative electrode apparatus for a nonaqueous electrolyte secondary battery according to claim 1, wherein the voids are present on a surface of the porous layer in a concave pattern, the surface being located on a side not facing the negative electrode active material.

4. The negative electrode apparatus for a nonaqueous electrolyte secondary battery according to claim 1, wherein an area fraction of the voids in a cross section of the porous layer that is perpendicular to the plane direction of the surface of the porous layer is 40% to 80%.

5. The negative electrode apparatus for a nonaqueous electrolyte secondary battery according to claim 1, wherein a surface of each void has an organic film.

6. The negative electrode apparatus for a nonaqueous electrolyte secondary battery according to claim 5, wherein the organic film comprises at least one selected from the group consisting of organic rubber, organic resin and metal carbonate.

7. The negative electrode apparatus for a nonaqueous electrolyte secondary battery according to claim 1, wherein the porous layer comprises a conductive agent.

8. The negative electrode apparatus for a nonaqueous electrolyte secondary battery according to claim 1, wherein the porous layer is directly formed on the negative electrode active material layer.

9. The negative electrode apparatus for a nonaqueous electrolyte secondary battery according to claim 1, wherein the voids are not interconnected.

\* \* \* \* \*